United States Patent [19]

Sommer et al.

[11] 4,095,760
[45] Jun. 20, 1978

[54] STRUCTURAL SKIN CONSTRUCTION MATERIALS AND METHOD

[75] Inventors: John H. Sommer, Belmont, Mich.; Sidney Axelrod, Skokie, Ill.

[73] Assignees: James A. Black, Kent City, Mich.; Top Flite Models, Inc., Chicago, Ill.

[21] Appl. No.: 784,075

[22] Filed: Apr. 4, 1977

Related U.S. Application Data

[63] Continuation of Ser. No. 621,413, Oct. 10, 1975, abandoned.

[51] Int. Cl.² .............................................. B64C 3/26
[52] U.S. Cl. .................................. 244/123; 46/76 R; 156/85; 264/342 R; 264/DIG. 71; 428/411; 428/913
[58] Field of Search ................... 244/123, 117 R, 133, 244/119; 156/84, 85, 86; 428/913, 411, 212, 421, 483; 264/DIG. 71, 342 R; 46/76

[56] References Cited

U.S. PATENT DOCUMENTS

| | | | |
|---|---|---|---|
| 3,186,866 | 6/1965 | Claeys | 428/212 |
| 3,228,823 | 1/1966 | Usala et al. | 428/421 |
| 3,388,651 | 6/1968 | Axelrod | 46/76 R |
| 3,488,249 | 1/1970 | Wolinski | 428/421 |
| 3,578,521 | 5/1971 | Evans | 156/84 |
| 3,900,653 | 8/1975 | Riboulet | 428/212 |

FOREIGN PATENT DOCUMENTS 657,427  2/1963  Canada .................................. 156/86

Primary Examiner—Galen L. Barefoot
Attorney, Agent, or Firm—Price, Heneveld, Huizenga & Cooper

[57] ABSTRACT

A structural cover skin for components of a fluid-medium craft, especially the foil components of the craft, wherein a layer of heat shrinkable, polymeric film, preferably of polyvinyl fluoride is bonded to a layer of heat-shrinkable polymeric film and/or fabric, preferably of polyester, to form a special laminated heat shrink covering material particularly useful for man-flown airplanes. A method for covering the frame portions includes an encapsulating envelope of the noted material or an overlapped wrapping which is heat shrunk tautly to the contours of the frame.

8 Claims, 8 Drawing Figures

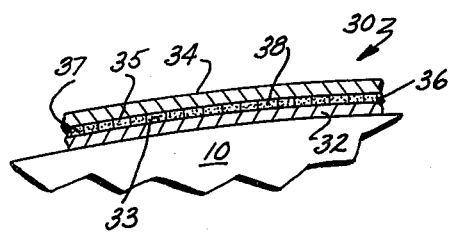
FIG. 4.
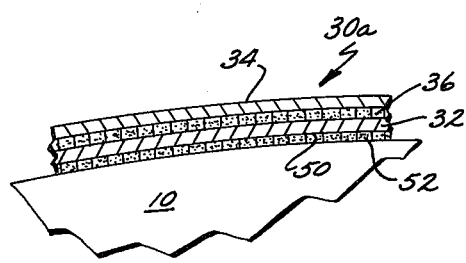
FIG. 5.
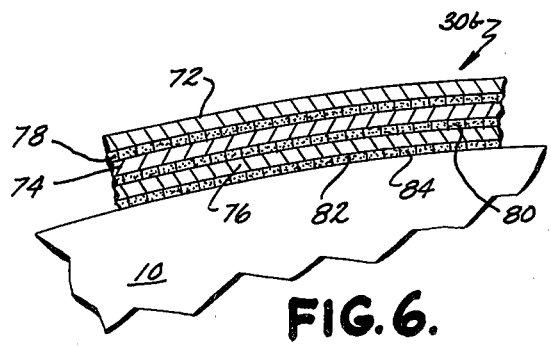
FIG. 6.
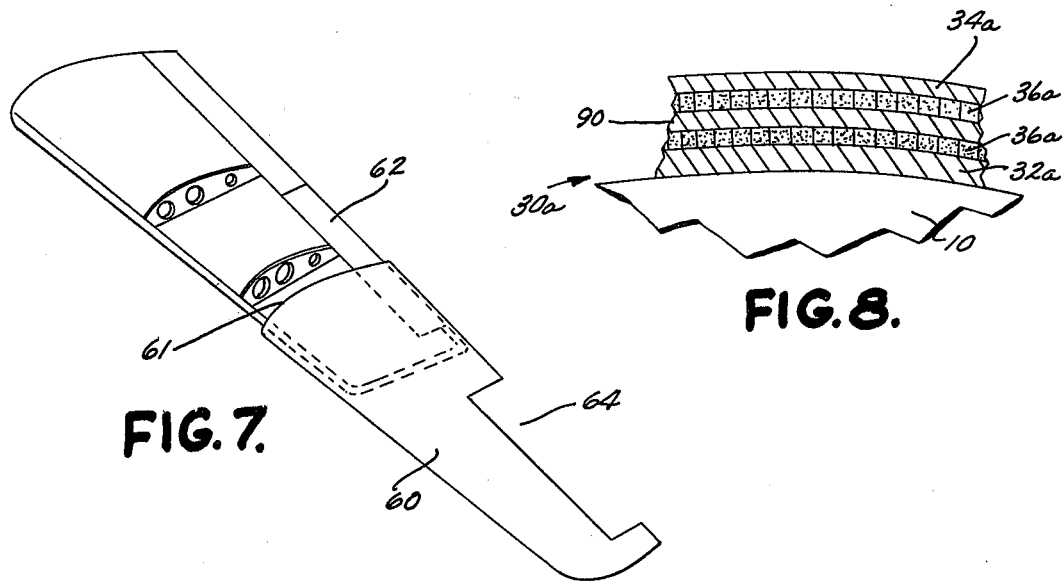
FIG. 7.
FIG. 8.

STRUCTURAL SKIN CONSTRUCTION MATERIALS AND METHOD

CROSS REFERENCE TO RELATED APPLICATION

This is a continuation of application Ser. No. 621,413, filed Oct. 10, 1975, now abandoned.

BACKGROUND OF THE INVENTION

This invention relates to covering materials for the structure of fluid medium craft, and more particularly, to a laminated plastic skin especially useful for aircraft and a method for applying the same to skeletal components of the craft.

In aircraft construction, weight, relative to lift, is generally the most critical parameter. Consequently, the airframe which includes the fuselage, airfoils, fin and stabilizer, etc., is covered by a skin-type material which is desirably light in weight and yet has the requisite strength in tension and shear to withstand the range of loading to which the aircraft will be subjected. Almost all commercially manufactured aircraft today are covered by metals such as aluminum or other lightweight alloys. Metal covering generally provides the best strength and the longest service life where cost is not a critical factor. However, it is heavier than non-metallic covers. Further, there exists today a significant segment of the aviation community involved with fabric or non-metallic covered airplanes.

Specifically, a significant number of flying enthusiasts in the general aviation community own or operate smaller aircraft which are totally or in part covered by a fabric-type skin. A commonly used fabric covering is comprised of a cotton linen which is placed over the frame and wetted to cause shrinkage and tautness, after which many layers of dope or lacquer are placed over the material to try to weatherproof it. A somewhat longer-lasting but more expensive covering are "Dacron" linens such as "Ceconite" or "Eonnex". Both of these, however, also require special coatings such as butyrate or acetate for weatherproofing and hardening. Also, all of these proposals require considerable labor and touching up between the application of multiple coatings so that the airfoil or fuselage has the proper amount of smoothness for minimum air drag. Finally, one or more layers of an appropriate coloring material are required to provide the desired color for that portion. One disadvantage of a fabric or linen wing is its propensity to tear or puncture if it accidentally comes into contact with a blunt object. Also, a uniform wetting and hence shrinking is not easily obtained. Where the shrinkage is nonuniform, wrinkles will occur which are extremely difficult to eliminate. All of these factors are extremely critical to the performance of the airframe portion as an airfoil and hence affect the ultimate performance of the aircraft itself.

In addition, a great number of these older airplanes are not hangered and hence subjected continually to the weather elements. The multitude of layers of lacquer or dope are not only intended to provide additional strength and rigidity to the fabric but also to provide somewhat of a protective coating against the weather. In addition to the weather elements of precipitation and wind, there is also the problem of ultraviolet deterioration caused by ultraviolet rays received from the sun. If the fabric or covering is not sufficiently protected from ultraviolet deterioration, the covering will embrittle and lose its strength. All of these foregoing factors determine the particular service life and safety of a particular covering.

There is a real need today in the aviation industry for an improved airframe covering material which is stronger, lasts longer and is relatively less expensive compared to present proposals. Safety after a considerable time period is most important. There is also a need for such a covering material which is considerably easier and cheaper to install.

SUMMARY OF THE INVENTION

This invention provides an improved cover skin material for fluid medium craft. It is heat-shrunk onto the frame of the craft. The skin material is composed of a particular combination of polymeric layers which eliminates the need for any additional steps of doping or lacquering to weatherproof and/or strengthen the covering. The skin is particularly advantageous for aircraft, even man-flown aircraft. A preferred form of this invention utilizes an adhesive having a coloring material interspersed therein which is insulated from the weather by the novel laminated covering, thereby eliminating the need for additional coats of paint to color the frame of the craft. The skin combines with the frame of a fluid foil to achieve excellent functional characteristics. The simplicity of applying the material of this invention and the significant durability and strength provided thereby effectuates an improved airframe covering material which is less expensive than existing proposals, is strong, and also has an extremely improved service life and safety factor.

According to the invention, the laminated cover skin is comprised of an exterior flexible layer of heat-shrinkable polymeric film highly resistant to ultraviolet radiation, preferably polyvinyl fluoride, and an interior flexible layer of heat-shrinkable polymeric film or fabric having high tensile and shear strength, preferably a polyester, the two layers being bonded together by an adhesive. The adhesive bonding of the two layers together eliminates tendency to buckle as a result of dissimilar shrink characteristics during heating.

The preferred method for applying materials of this invention encompasses the pre-preparation of an encapsulating envelope of the laminated material, placing such around the frame portions, and then applying heat to controllably shrink the envelope tautly onto the frame portions. In the alternative, the frame portion is wrapped with a predetermined sheet-like length of the material, the ends being overlapped to provide a continuous seam along the overlap, after which the material is heat-shrunk.

Other alternative forms of this invention include sandwiching the polyester between an inner and outer layer of polyvinyl fluoride. Also, the inner surface of the laminate material may be precoated with an adhesive for initially bonding the material to the airframe, which adhesive is heat activated during the heat-shrinking step. In addition, a coloring material can be interspersed within one of the adhesive layers and is visible through the material and completely insulated from extraneous elements and materials by the laminated layer.

DESCRIPTION OF THE DRAWINGS

FIG. 4 is a fragmentary enlarged sectional view illustrating one form of this invention;

FIG. 5 is a fragmentary enlarged sectional view of a second form of this invention;

FIG. 6 is a fragmentary enlarged sectional view illustrating a third form of this invention;

FIG. 7 is a perspective view illustrating an alternative method of applying the material of this invention; and FIG. 8 is a fragmentary enlarged sectional view of a fourth embodiment of the invention.

DESCRIPTION OF THE PREFERRED EMBODIMENT

The covering of an aircraft frame with an outer skin is generally achieved section by section beginning with portions of the fuselage and continuing with the wings, tail, stabilizer, etc. The wing and tail assemblies include movable control surfaces such as ailerons, rudder and elevators. These require separate covering to insure their freedom of movement. Regardless of the particular composition of the covering skin, it must be tough in the sense that it can withstand the tensioning, bending and tear forces to which it is subjected while at the same time be as light as possible so that the overall performance of the aircraft is enhanced. In addition, it must be weatherproof in the sense that it resists deterioration from the elements and extraneous materials, and it must be fire resistant, an ever-present concern in the aviation industry since highly combustible fuel is present.

Figure 1:
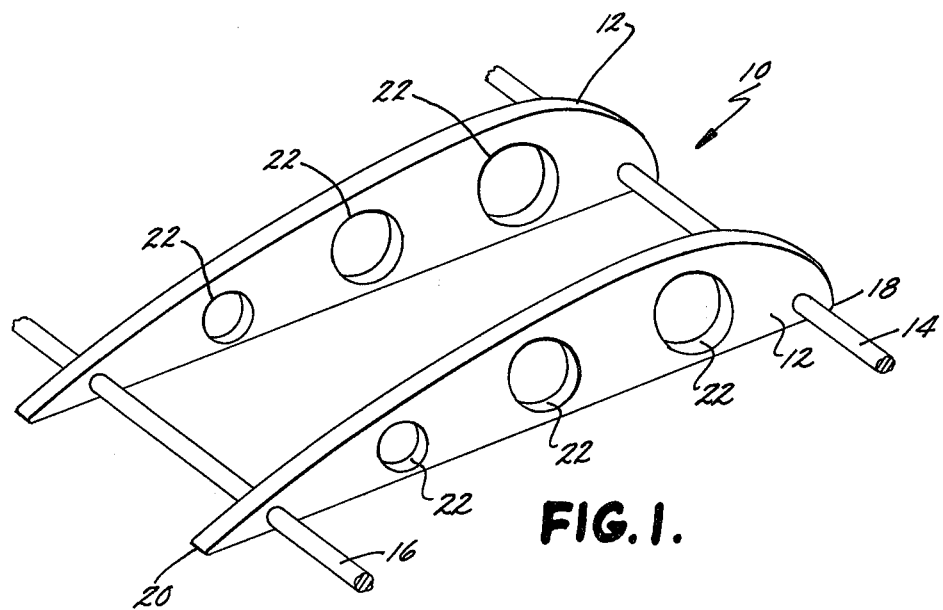
FIG. 1 is a perspective view of a portion of an exemplary airfoil frame showing a pair of interconnected adjacent ribs.

Referring now to the drawings in detail, FIG. 1 is a perspective view of a portion of a wing 10 showing a pair of spaced airfoil ribs 12 which are anchored relative to each other by front and rear spars 14 and 16 respectively. The shape of the airfoil ribs defines the overall configuration and aerodynamic characteristics of the wing. The wing shown includes a leading edge 18 and a trailing edge 20 which are used as reference points for the various airfoil parameters. The plurality of openings 22 reduces the overall weight of the airfoils without reducing their strength. At the same time, these openings are useful to permit the passage of control wires to the control surfaces such as the wing ailerons.

Referring now specifically to FIG. 4, a fragmentary portion of a laminated covering material 30 provided by this invention is shown in cross section. This figure as well as FIGS. 5 and 6 are disproportionate in size for illustration purposes. Covering material 30 includes an inner plastic layer 32 and an outer plastic layer 34. When mounted to an airframe portion such as airfoil 10, inner layer 32 will be completely shielded by outer layer 34. In a preferred aspect, the two layers are bonded together by an adhesive 36 to form the laminated material prior to its mounting to the airframe.

The interior layer 32 is of a heat-shrinkable polymer of high tensile and shear strength, preferably a flexible, heat-shrinkable polyester fabric and/or a biaxially oriented polyester film such as "Mylar". This layer provides the basic strength of the covering material. When heated, it begins to shrink and become responsive to the form or shape of the portion which it covers. Upon cooling, it shrinks still further to the contours of the frame and becomes taut and strong but not brittle. The shrinking of the polyester film characteristics are even and biaxial, so that the problem of uneven shrinkage or buckling is minimal. Other alternative polymeric films which are biaxially oriented and in addition tough in the sense that they have high impact resistance, are polycarbonate film and/or biaxially oriented polypropylene film.

However, it has been found that the polyester as a covering material in and of itself for a man-bearing craft lacks adequate resistance to ultraviolet deterioration. That is, when exposed to the rays of the sun over a period of time, it becomes brittle. Once this occurs, the covering is no longer useful as a man-bearing craft and is in fact dangerous. Furthermore, its weakness may not be readily apparent. While polyester has been suggested as a covering material by itself for model airplanes, e.g., see U.S. Pat. No. 3,388,651 issued to Axelrod, on June 18, 1968, ultraviolet deterioration is of little concern there since these types of airplanes are seldom continuously exposed to the weather, and in addition, the tendency to embrittle does not render the aircraft unflyable since the transportation of human lives is not involved.

With the present invention, the inner layer 32 of polyester is covered with an outer layer 34 which not only adds to the overall strength but also resists ultraviolet radiation. Although generally translucent and often even transparent, it shields the inner layers. This outer layer is preferably comprised of a polymeric film which is chemically inert and thus ages extremely well. An ultraviolet absorbing grade of polyvinyl fluoride film such as "Tedlar-Ut" has been found to have an extremely high resistance to ultraviolet penetration. Its inertness makes it resistant to weather fatigue, staining, and indeed, it retains its glossy appearance extremely well. The combination of these two layers as a laminated covering material for aircraft structure has thus been found to be very effective.

Preferably, the two layers 32 and 34 are bonded together by an adhesive 36 into a relatively thin laminated sheet-like material 30 which can be manufactured in various sizes or rolls and hence conveniently stored and shipped.

The adhesive bonding material 36 also serves an additional function. It has been found that while both polyester and polyvinyl fluoride shrink when heated, their shrink rates are dissimilar. As noted earlier, polyester shrinks biaxially and generally uniformly with heating. Polyvinyl fluoride, however, initially expands in the cross direction while contracting in the mill direction, although when subjected to elevated temperatures, it contracts in both directions. By bonding the two layers together into a laminated covering material prior to installation on the airframe portion, adhesive 36 restricts the polyvinyl fluoride layer 34 from becoming distorted relative to the polyester layer 32 during heat shrinking. While there is some initial tensioning between the two layers during initial heating as the result of this dissimilar shrink rate, the layers are successfully restrained from buckling and rippling until the point where this propensity passes due to the eventual shrinkage of the two layers being similar.

Although a variety of conventional film adhesives may be employed, preferably the adhesive is one which has an initial pressure sensitive characteristic, and also is heat curable. It can be a solvent solution type. This permits coating (FIG. 4) of the outer surface 33 of the polyester layer or the inner surface 35 of the polyvinyl fluoride layer with adhesive 36 which will bond the two layers together with the application of pressure. This subsequently becomes fully cured. A polyester resin treated with an isocyanate has proven to provide the desired properties in that it is cured with time at room temperature or accelerated with heat and yet maintains good tensile properties. If heat is used to cure the adhesive before the layers are applied to the frame, the heat must, of course, not be so great as to cause premature shrinkage of the layers.

With the covering material provided by this invention properly positioned and heat shrunk over the frame, there is no requirement of any additional doping or other solution covering to rigidify, weatherproof, fireproof or age the covering material.

The laminated layers of polyester and polyvinyl fluoride are quite flexible to permit easy installation of the covering material over the airframe portions. In one aspect of this invention, adhesive bond 36 is interspersed with a coloring material 37 such as inorganic pigments of the type used in paints to provide any of various preselected colors for the covering material. When this feature is utilized, the polyvinyl fluoride layer should be clear and transparent, or at least translucent so that the coloring material will be clearly visible through the polyvinyl fluoride layer. This completely eliminates the necessity to take additional steps to coat the covering material with a paint or dye, although this may be done if desired. In addition, the interspersion of coloring material 37 in adhesive layer 36 intermediate inner and outer layers 32 and 34 provides additional ultraviolet protection for the polyester layer 32. An alternative form is to pigmentize the polyvinyl fluoride layer with the desired color when it is manufactured. This also increases the ultraviolet protection for the polyester layer. It is envisioned that the covering material described above will be custom made to fit various portions of various aircraft and ordered by color.

Figure 2:
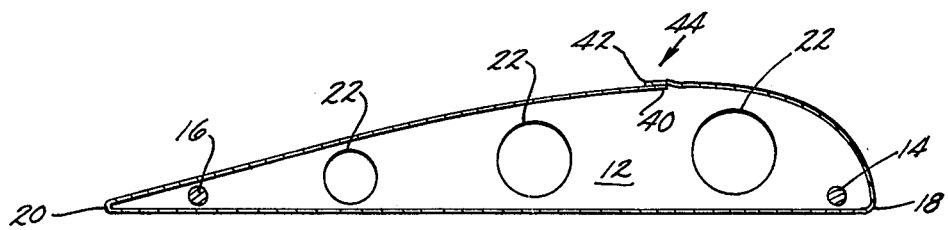
FIG. 2 is a cross sectional view of a foil covered by the laminated material of this invention.
Figure 3:
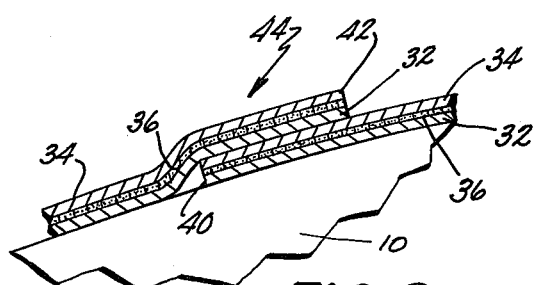
FIG. 3 is a fragmentary enlarged sectional view illustrating the overlapped seam according to one method of this invention.

One method of applying the covering material of this invention is shown in FIGS. 2 and 3. The covering material, prefabricated as described into a flexible roll or sheet or arbitrary length, is wrapped around the particular frame portion to be covered such as the foil shown in FIGS. 2 and 3. In this method, the sheet is wrapped with the opposite ends 40 and 42 overlapping each other at their juncture 44. A heat-activated adhesive 35 is applied between the overlapping ends so that when the sheet is heat shrunk over the wing, the ends 40, 42 of the sheet become bonded together. The method of this invention does not require that the covering be initially placed on the frame in a careful and smooth manner or that the covering be wrinkle free. The application of heat will smooth the material out as it is heat shrunk over the frame. The double layer of material at juncture 44 insures the complete covering of the airfoil after heat is applied and the covering material shrinks. Without some overlapping, the shrinkage of the covering material would cause a gap, thus exposing a portion of the frame. Also, by bonding ends 40 and 42 together, additional strength is achieved. In addition, the overlapping provides a smooth and continuous seam at juncture 44. To further assure a good scuff resistant joint, the lapped area may be sealed with a clear sealer similar to adhesive 36. Since the flow of air over airfoil 10 is from right to left (as it is depicted) end 40 of covering material 30 (FIG. 4) is preferably lapped over end 42 as shown in FIGS. 2 and 3 to minimize the interruption of air flow over the foil.

To assure sufficient tautness and to effect a secure bond between airfoil 12 and laminated covering material 30, heat is applied to the covering material. It becomes more pliable, and as it cools, shrinks to the contour of the frame, removing all traces of wrinkles. The result is a tight and wrinkle-free skin covering. Heat may be applied conventionally by an iron, a hot air blower, or other suitable heating devices commonly employed for heat shrinking. The wing tip or other points of termination on the airframe portion being covered is dealt with in a fashion similar to that explained with regard to juncture point 44 shown in FIG. 3. A sufficient amount of overlap is provided at the wing tip, with the edges being folded over one another, so that shrinkage resulting from the application of heat will not cause a gap in the covering. Additional adhesives are manually applied to insure a positive connection.

Referring to FIG. 7, an alternative method envisioned by this invention is the prefabrication of the covering material 30 into an envelope 60 with an opening 61 dimensioned to be pulled over and encapsulate the particular airframe portion such as wing 62. The size of the particular envelope will vary depending on the craft, but this form of application eliminates the installer's concern with the overlapping seams. Such an envelope can be factory ordered with the desired coloring and simply slipped over the particular portion such as a wing and heat shrunk. It will be appreciated that such envelopes will include cut-out areas 64 for the control surfaces such as an aileron and these control surfaces must be separately covered, unless they are metallic.

Referring now to FIG. 5, an alternative form of this invention is shown. The covering material 30a is identical to material 30 described previously with regard to FIG. 4. Thus, it includes an outer layer 34 of polyvinyl fluoride and an inner layer 32 of polyester bonded together by an adhesive 36. However, the exposed surface 50 of the polyester layer is precoated with an adhesive 52 for bonding the covering material to the airfoil. This adhesive layer 52 may also be pigmentized singly or with layer 36 to provide an appropriate coloring of the material. In this case, both layers 32 and 34 should be clear. This embodiment is especially useful in those applications wherein the covering material does not entirely encapsulate or wrap around the frame portion but rather covers only a portion of its total surface.

Preferably, layer 52 is a dry adhesive which is activated by heat or a solvent. A pressure-sensitive initially sticky adhesive may be converted to a dry adhesive in a conventional manner such as the application of a zinc stearate material over the exposed face of the pressure sensitive adhesive, causing the latter to loose its tackiness. After covering a portion of the airframe and applying heat, the adhesive is activated, causing a bond between the polyester layer and the frame. It will be appreciated that there may be instances wherein it is desirable to apply the covering material to the frame portion with the adhesive layer 52 being tacky, to initially secure the covering material to the selected portion. In these cases, the tacky adhesive layer can be protected by release paper (not shown). However, when large amounts of the material are involved, it is generally easier to position the strips or envelopes of material over the frame portion if the adhesive is not totally effective until heated.

Another aspect of the adhesive being initially dry or, if tacky covered with release paper, is that the laminated covering material 30 may be conveniently stored in rolls rather than sheets, and any particular length thereof can be easily dispensed and shipped to the purchaser.

With reference to the embodiment shown in FIG. 5, if the covering material is to be pre-colored, it is still preferred that the coloring material be interspersed within adhesive layer 36 as described previously with regard to the embodiment shown in FIG. 4 since the coloring material provides some insulation to deterioration of the polyester layer. However, it will be appreciated that the coloring material could be interspersed within adhesive layer 52. In this case, both the polyester layer 32 and polyvinyl fluoride layer 30 should be clear and transparent or translucent.

Yet another alternative form is shown in FIG. 6 wherein the laminated covering material 30b is shown comprised of three layers of polymeric film 72, 74 and 76. Layer 74 is preferably a polyester sandwiched between two layers 72 and 76 of polyvinyl fluoride. This completely shields the polyester layer on both sides while adding to the total strength of the laminate. The three layers 72, 74 and 76 are bonded together by adhesive layers 78 and 80 and where desired, the inner surface 82 of the laminate may be precoated with an adhesive layer 84 for initial bonding to the frame. Another alternative envisioned might include a layer of spun-bonded polyester film which has a shrink ability similar to the polyester and polyvinyl fluoride. Such a layer is comprised of monofilaments arranged in sheet form and fused together. It is also envisioned to employ a shrinkable scrim fabric of polyester. In certain applications, these types of layers significantly increase tear resistance especially in case of puncture.

Turning now to FIG. 8, the embodiment shown is particularly adapted for uses where the possibilities of tearing exists. In this embodiment, the laminate 30a includes a fabric 90 having anything from a scrim type construction to a nonwoven, spun-bonded or a more conventional weave construction. This layer may be cemented to the outer side of the high tensile polyester film 32a or between it and the polyvinyl fluoride layer 34a. In FIG. 8, the fabric is shown cemented on each side by an adhesive layer 36a intermediate the polyvinyl layer 34a and polyester film 32a. Variations are envisioned such as the cementing of the fabric on the inside of the polyester film. With or without the fabric, the layer that gives the protection from the elements and sunlight is the polyvinyl fluoride layer.

The methods for applying the embodiments shown in FIGS. 5 and 6 are similar to that shown with regard to FIG. 4. If the sheeting is to be wrapped around the airfoil as shown in FIG. 2, either a dry adhesive or tacky adhesive can be used. However, if the covering material is prefabricated into an encapsulating envelope 60 as shown in FIG. 7, it is envisioned that an initially dry adhesive will be used to facilitate the envelope being pulled onto and over the airfoil or other portions.

The foregoing description sets forth a unique laminated frame covering material for fluid craft that is flexible to permit installation over a frame portion and then heat shrunk to remove all traces of wrinkling and buckling and provide a skin-tight and wrinkle-free covering. The novel combination of an interior layer of polyester shielded by an exterior layer of polyvinyl fluoride provides a bonded laminated material which is both strong and weather-proof. A significant advantage of the invention described is the elimination of coating the covering material as heretofore required with cotton, linen, or "Dacron" fabrics. Not only is there a significant saving in the cost of coating materials, but a significant reduction in the amount of time required to cover the airframe portion. In addition, the improved service life significantly reduces the replacement costs.

Also, it is possible to embed a preselected coloring material within the laminated covering so that the coloring material is completely insulated from the elements or other extraneous materials. This not only eliminates the necessity of additional painting coats, but greatly increases the service life of the paint since it is not subject to conventional wear from the weather. Since the polyvinyl fluoride shields the paint or coloring material from ultraviolet deterioration, its appearance does not fade but rather continually appears to be new.

It will be apparent to those in this art that the details of construction of the several illustrative embodiments set forth may be modified in various ways within the unique concept presented. It is therefore intended that the invention is limited only by the scope of the appended claims rather than by particular details of construction shown, except as specifically stated in the claims.

The embodiments of the invention in which an exclusive property or privilege is claimed are defined as follows:

1. In combination with an aircraft frame, a flexible laminated heat-shrinkable covering material applied thereto, said covering material comprising interior and exterior layers of polymeric film adhesively bonded together, said interior layer being resistant to impact, tensile, and shear forces, and being biaxially oriented, said exterior layer being resistant to ultraviolet penetration to shield said inner layer and having dissimilar coefficients of expansion and contraction from that of said inner layer, with said heat-shrinkable material providing substantially smooth and wrinkle free interior and exterior surfaces after being heat-shrunk about said frame.

2. The combination according to claim 1 wherein said exterior layer is comprised of polyvinyl fluoride, and said interior layer is comprised of polyester, said material when heat-shrunk providing a strong weatherproof cover resistant to embrittlement and deterioration.

3. The combination according to claim 1 wherein said covering material further includes a layer of fabric material beneath said exterior layer to resist tearing of said laminated material.

4. In combination with a fluid craft frame, a flexible laminated heat-shrinkable covering material applied thereto, said covering material comprising interior and exterior layers of polymeric film adhesively bonded together, said interior layer being resistant to impact, tensile, and shear forces, and being biaxially oriented, said exterior layer being resistant to ultraviolet penetration to shield said inner layer and having dissimilar coefficients of expansion and contraction from that of said inner layer, with said heat-shrinkable material providing substantially smooth and wrinkle free interior and exterior surfaces after being heat-shrunk about said frame.

5. The method according to claim 4 wherein an additional layer of fabric material is provided, said fabric being affixed beneath said polyvinyl layer to resist tearing of said laminate.

6. A laminated fluid-craft skin material for covering portions of a fluid-craft frame comprising exterior and interior flexible layers bonded together, said exterior layer comprising a heat shrinkable polyvinyl fluoride having resistance to ultraviolet penetration, said interior layer comprising a heat shrinkable polyester having high tensile and shear strength, said material being capable of heat shrink application to the frame; and an adhesive between said layers preventing relative displacement between said layers during heating as a result of dissimilar coefficients of expansion and contraction between the layers.

7. In a method for covering portions of an aircraft frame or the like, the steps of: providing a laminated covering material having a pair of flexible layers adhesively bonded together, one of said layers comprising heat shrinkable polyvinyl fluoride resistant to ultraviolet penetration; the other of said layers comprising heat shrinkable polyester having high tensile and shear strength; applying a predetermined amount of said covering material to said portions of said aircraft frame to be covered in a manner that said polyvinyl fluoride layer of said material comprises the outer surface thereof; and thereafter applying heat to said material to cause said material to shrink tautly to the contours of said frame portions to provide a strong weather-proof cover for said portions resistant to embrittlement and deterioration.

8. The method according to claim 7 wherein the interior surface of said laminated material is precoated with an adhesive substance which bonds when heated, said adhesive bonding said laminated material to said air-frame portions.

* * * * *

UNITED STATES PATENT AND TRADEMARK OFFICE
CERTIFICATE OF CORRECTION

PATENT NO. : 4,095,760
DATED : June 20, 1978
INVENTOR(S) : John H. Sommer et al

It is certified that error appears in the above-identified patent and that said Letters Patent are hereby corrected as shown below:

Issue date:
"Jun." should be ---June---

Column 2, line 33:
"the" should be ---this---

Column 5, line 40:
Second occurrence of "or" should be ---of---

Column 7, line 42:
"polyvinyl layer" should be ---polyvinyl fluoride layer---

Signed and Sealed this

Twenty-seventh Day of February 1979

[SEAL]

Attest:

RUTH C. MASON
Attesting Officer

DONALD W. BANNER
Commissioner of Patents and Trademarks